United States Patent
Vetter

[11] 3,762,102
[45] Oct. 2, 1973

[54] APPARATUS FOR GRINDING CYLINDRICAL AND CONICAL WORKPIECES

[75] Inventor: Ulrich Vetter, Stuttgart-Hedelfingen, Germany

[73] Assignee: Schaudt Maschinenbau GmbH, Stuttgart, Germany

[22] Filed: Feb. 19, 1971

[21] Appl. No.: 116,888

[30] Foreign Application Priority Data
Mar. 9, 1970 Germany................... P 20 11 090.1

[52] U.S. Cl............................................. 51/105 SP
[51] Int. Cl................................................ B24b 5/14
[58] Field of Search...................... 51/3, 89, 105 SP, 51/105 R

[56] References Cited
UNITED STATES PATENTS

| | | | |
|---|---|---|---|
| 2,639,559 | 5/1953 | Price | 51/105 SP X |
| 2,654,189 | 10/1953 | Dunn | 51/105 SP X |
| 3,145,507 | 8/1964 | Price | 51/105 SP |
| 2,807,916 | 10/1957 | Squire | 51/3 X |
| 3,562,958 | 2/1971 | Martin | 51/3 |
| 3,643,383 | 2/1972 | Asano | 51/105 R |
| 2,082,727 | 6/1937 | Wood | 51/105 SP |

Primary Examiner—Donald G. Kelly
Attorney—A. C. Smith

[57] ABSTRACT

For grinding selectively cylindrical and conical workpieces a grinding machine equipped with two grinding wheels is utilized, one of which wheels is mounted with its grinding face parallel to the axis of rotation of the workpiece, and the second of which wheels is mounted with its grinding face under an angle to said axis of the workpiece. This second wheel may be conical, or its axis of rotation may be mounted under an angle to the axis of the workpiece. In a preferred embodiment the axis of rotation of the second grinding wheel may be adjusted according to the desired angle of the cone portion of the workpiece, and if an easy to operate and reliable adjusting mechanism for the second grinding wheel is provided, the first of said grinding wheels may even be omitted.

6 Claims, 6 Drawing Figures

APPARATUS FOR GRINDING CYLINDRICAL AND CONICAL WORKPIECES

BACKGROUND OF THE INVENTION

Frequently it is necessary to grind cylindrical and conical seats into one workpiece. Up to now said workpiece was first processed on a grinding machine utilized e.g. for grinding a cylindrical seat; then said workpiece was clamped into a second grinding machine designed for grinding the required conical seat. Unfortunately, there always occur eccentricity errors when clamping the said workpiece from the first into the second machine, i.e. the axis of the cylindrical seat disagrees with the axis of the conical seat.

Therefore, according to prior art the cylindrical and the conical seats can be ground into one workpiece in one setting thereof. For this purpose, the workpiece is swivelled, i.e. the workpiece axis is brought into a position to enclose one angle with the axis of the grinding face, said angle corresponding to the cone opening angle of the conical seat to be ground.

This prior art procedure, however, shows a series of serious disadvantages which could not be eliminated so far. Even due to the considerable space required by the grinding-wheel head the possible movement range for the workpiece is severely limited, and thus only conical seats with a very small angle of opening can be ground.

If during the actual production process conical and cylindrical seats are to be ground into one workpiece there is a further disadvantage in that the workpiece adjustment, i.e. the movement of the workpiece support, because of its length, usually requires a multiple of the time required for the actual grinding process. And these delays are prohibitive for the production process.

Due to these two reasons it was not possible up to now — at least for industrial production processes — to grind conical and cylindrical seats in one setting of the workpiece.

Nowadays, machine tools with gage units are preferred, particularly for numerically controlled machinery for which such gage systems cannot be omitted. However, with such machine tools there is still a further disadvantage, namely the range in which the workpiece can be moved for long grinding is very much limited by the gage unit.

SUMMARY OF THE INVENTION

Therefore, it is an object of the invention to provide apparatus for grinding cylindrical and conical seats into a workpiece, whereby all seats can be ground in one setting, thus avoiding the prior art limitations and disadvantages. This object is realized according to the present invention by the feature that the grinding face provided for grinding the following seat is brought into the required position relatively to the workpiece.

Basically, there are two solutions offered for carrying out the revealed process. First, the workpiece can be applied to a grinding-wheel face for cylindrical seats, and then to a face for conical seats. Second, a grinding-wheel face can be adjusted according to requirements for cylindrical or conical seats, and then the workpiece can be applied to this face accordingly.

To carry out the first solution an apparatus is suitably provided with a bench upon which are arranged a workpiece support, and at least two grinding-wheel heads. Basically, such devices are e.g. utilized for simultaneous grinding of several cylindrical seats into a longer workpiece. However, for carrying out this first solution, this prior art apparatus must be adapted in such a manner that one of the grinding wheels is laid out for grinding cylindrical seats, and one wheel or wheels resp., for grinding conical seats; furthermore, that the workpiece support can be shifted in the direction of the workpiece axis in such a way that the workpiece positions into which cylindrical or conical seats resp., are to be ground, can be positioned in front of the grinding-wheel face of the grinding-wheel head concerned.

For adapting the grinding wheel for grinding conical seats known methods are available to start with, e.g. a grinding-wheel head adjusted for grinding conical seats can hold a grinding wheel the face of which is made conical according to the conical seat to be obtained.

According to another method the spindle or wheel axis of the grinding wheel for grinding conical seats is arranged with respect to the workpiece axis, under an angle corresponding to the cone angle of the conical seat to be ground.

However, both methods share the disadvantage of rendering it impossible to change over to conical seats having different cone opening angles during actual production, i.e. when machining a workpiece.

This disadvantage is eliminated according to an improvement of the lastmentioned embodiment if a grinding wheel head angularly displaced with respect to the workpiece axis can be adjusted into at least two angle positions by moving around an axis which is displaced from the workpiece axis and which is perpendicular to a plane in which the workpiece axis lies.

For initially adjusting the grinding wheel it is prior known to pivot the grinding-wheel head around an axis perpendicular to the workpiece axis. This works both for grinding cylindrical or conical seats. Adjusting the angle position during production was not considered here as this object was never through about up to now altogether. Therefore, the prior art moving methods of the grinding wheel have only been designed as pure adjusting means, i.e. a readjustment of the required angle necessitates considerable personnel and time expenditure. Any machine tool designer, though, could have utilized available mechanical designs permitting pivoting without personnel and time expenditure worth mentioning, e.g. a turntable used with drilling machines.

Analogously to the workpiece turntables of drilling machines the angle positions of a grinding-wheel head can be terminated by stops or the like; said method be quite advantageous if the machine concerned persumably is intended only for conical seats with a few known cone opening angles, mainly because contacting a stop can be carried out so fast that the delays occurring can practically be disregarded during actual production; anyway, they should not be more than the period required for adjusting the workpiece for grinding the seat concerned.

If, however, the cone opening angle of the seat to be ground is not known beforehand, or if a plurality of such angles must be expected, it is of course possible to arrange several of such adjustable grinding wheels upon one bench. But such arrangements are limited, not only as to machinery required but also due to the increasing space due to the length of the workpiece support guide system.

It is advisable to have various arbitrary angle positions of the grinding-wheel head. If the grinding-wheel head can be adjusted as required it will usually be necessary to check the adjustment before starting the grinding process in order to maintain the required and usual precision.

Using a gage system it will, however, be possible to adjust any required angle position of the grinding-wheel also during actual production processes. This is only feasible if numerically-controlled machinery is used and then it is preferred to apply the earlier stated basical method for carrying out the process stated by this invention, i.e. to adjust the grinding wheel according to the required cylindrical or conical seats, and then to apply the workpiece to the said grinding wheel so that only one individual grinding wheel is provided. For this process then only one machine unit is provided with one bench carrying one workpiece support, and one grinding-wheel head; and this prior art apparatus is laid out in such a manner that the wheel axis of the grinding wheel can be moved by swivelling around an axis perpendicular to the workpiece axis into a variable angle position with respect to the workpiece axis, while the workpiece is clamped into the workpiece support.

There is a decisive handicap in the devices for carrying out the inventive process described so far, for it is not possible to grind conical seats the length of which is more than the width of the grinding face. In order to grind such conical seats the grinding wheel must be shiftable in direction of the spindle or wheel axis during the grinding process; according to a special improvement of the invention said grinding-wheel head is therefore angularly displaceable with respect to the workpiece axis, or adjustable accordingly, or movable into this position so that it can be shifted during the grinding process parallel to the cone seat to be ground.

This permits then the socalled long grinding process which can be carried out for cylindrical seats by longitudinal movement of the workpiece support during the grinding process.

As to the feed movement, the same can be carried out as usually used when moving the grinding-wheel head in the direction perpendicular to the workpiece axis; however, if the grinding-wheel head is arranged with a spindle or wheel axis angularly displaced to the workpiece axis, it is more favorable to have the feed movement perpendicular to the spindle axis of the grinding wheel, mainly, because then the length of the feed range won't depend on the angle for which the grinding wheel axis is displaced versus the workpiece axis.

If the grinding wheel is swivably mounted it is advantageous to swivel the feed guide in the same way so that with an embodiment with a wheel head swivable in the direction of the spindle axis during the grinding process, there is obtained a cross slide system to be displaced according to the displacement of the wheel axis, or which can be adjusted or swivelled together with same, resp.

DESCRIPTION OF PREFERRED EMBODIMENTS

Figure 1:
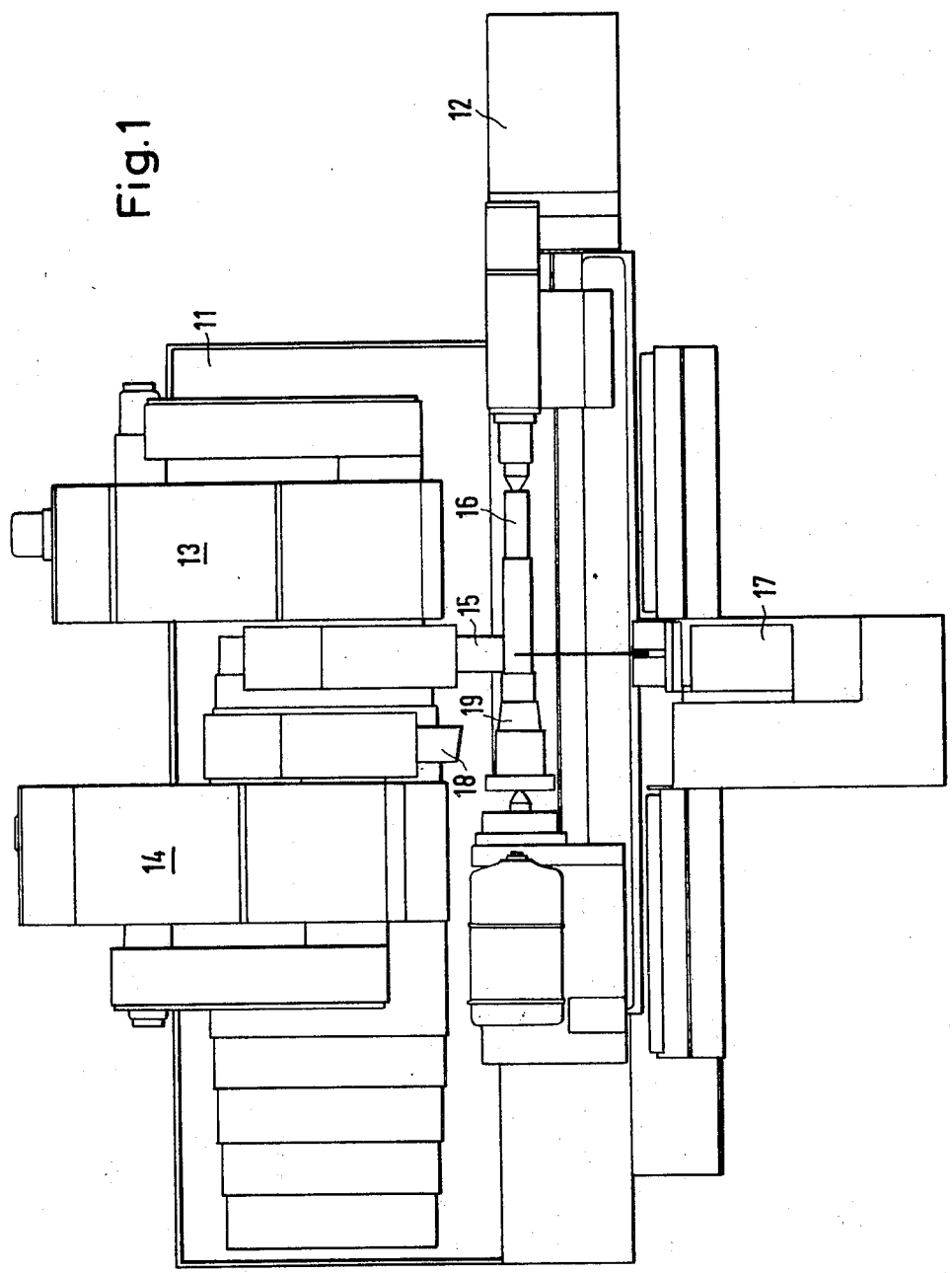
FIG. 1 shows an embodiment of the grinding machine according to the present invention.

FIG. 1 represents a grinding machine with a bench 11 upon which is mounted a workpiece support 12 of usual design, as well as two grinding wheel heads 13 and 14. Opposite to the grinding wheel 15 of the grinding wheel head 13 is provided a gage unit 17 according to the prior art i.e. on that side of the workpiece 16 not facing the wheel 15; said gage unit 17 being provided for gage-controlled grinding of cylindrical seats by the face 15.

The grinding wheel head 14 features a grinding wheel 18 the face of which is conical corresponding to the conical seat 19 to be ground into the workpiece 16.

For grinding the workpiece 16 first of all the cylindrical seats — which are not provided with reference numerals but which are represented in the drawing at the right hand of the conical seat 19 — are brought in front of the cylindrical grinding wheel 15 of the grinding wheel head 13, by longitudinal movement of the workpiece support 12, and the seats are ground in the usual manner while being controlled by the gage unit 17.

Figure 2:
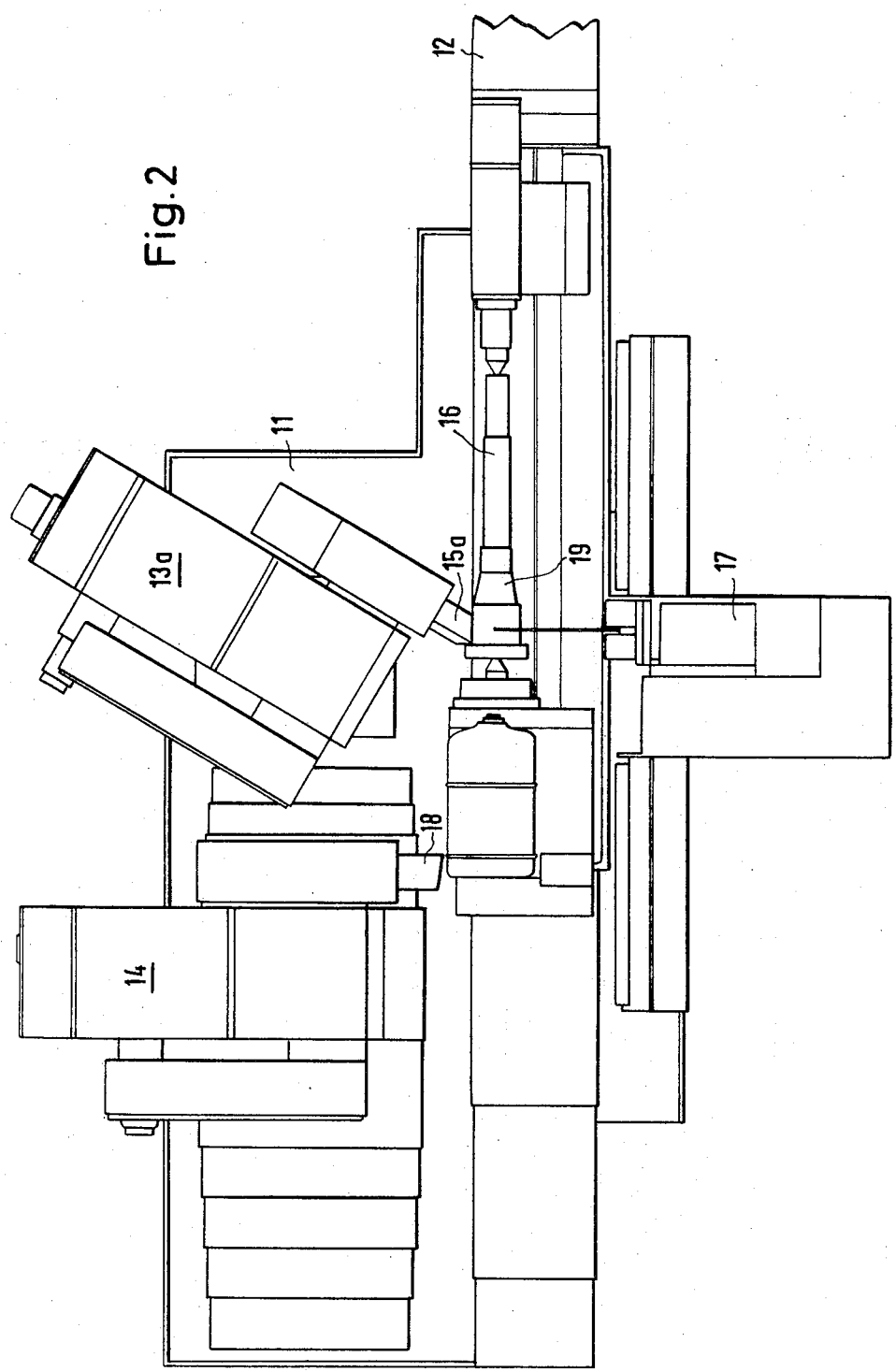
FIG. 2 shows a modified embodiment of the grinding machine according to FIG. 1.

Thereupon, the conical seat 19 is brought in front of the conical grinding wheel 18 of the grinding wheel head 14 by suitable longitudinal movement of the workpiece support 12, subsequently this grinding wheel head is fed in the usual manner, and the conical seat 19 is ground accordingly. The preferred embodiment does not provide for gage-controlled grinding of the conical seat 19 with a gage unit 17, however, such a modification is easily possible in that either the gage unit can be moved to the left side accordingly (see FIG. 1), or in that a second gage unit is arranged opposite to the conical grinding wheel 18. FIG. 2 shows a grinding machine largely similar to the embodiment of FIG. 1. Therefore, the same reference numerals are used for identical parts. The difference is that the grinding wheel head 13a is swivelled by 30° versus the workpiece axis !16, and that the grinding wheel 15a is laid out in known manner for shoulder grinding. Therefore, a further description of the working method may be omitted.

Figure 3:
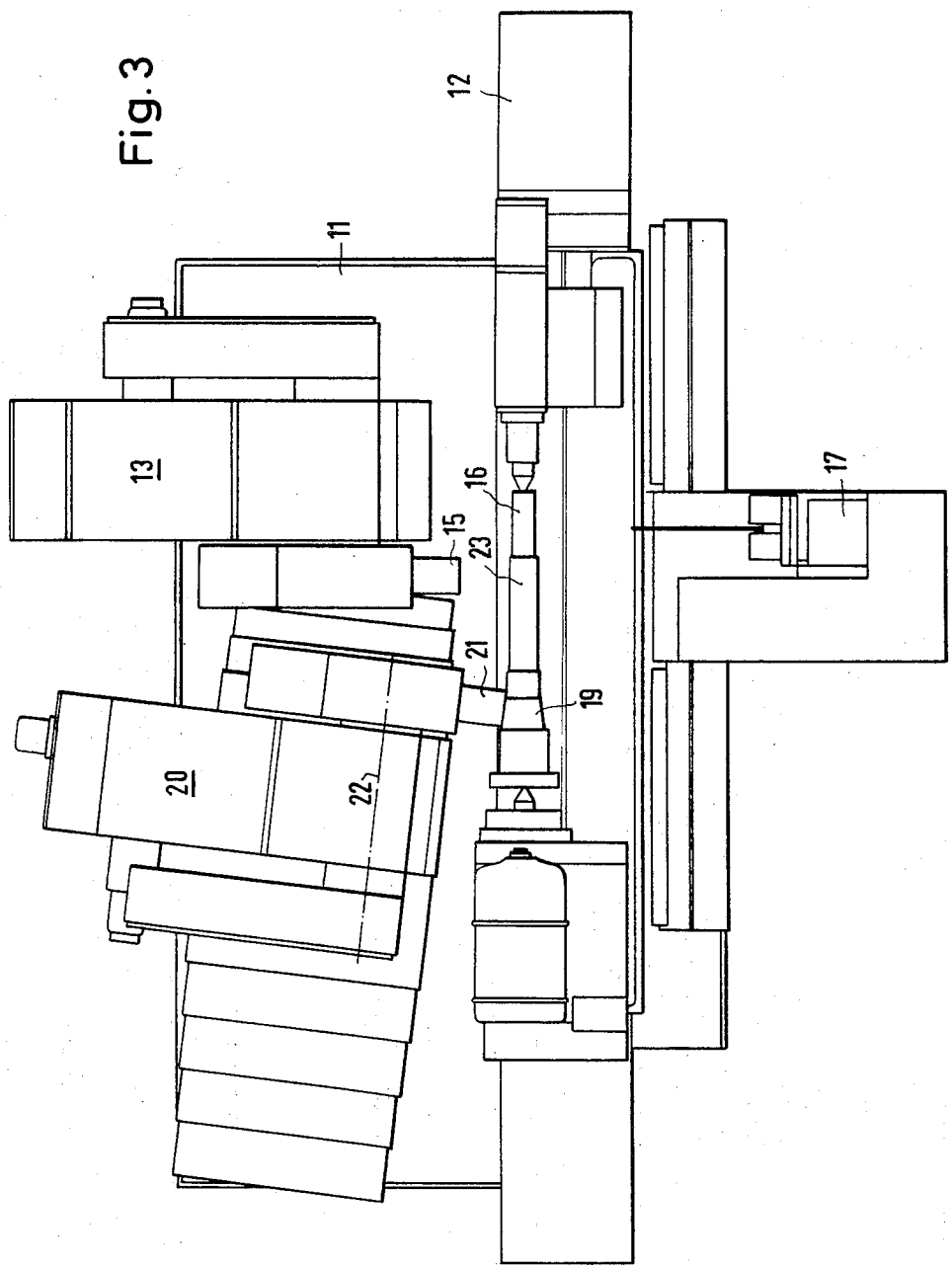
FIG. 3 shows a second embodiment of a grinding machine according to the present invention.

FIG. 3 shows a second embodiment of the invention. Basically it corresponds to the embodiment according to FIG. 1, and therefore, largely the same reference numerals are used again. However, compared to the embodiments of FIGS. 1 and 2, instead of wheel head 14 having a conical wheel 18, a grinding wheel head 20 is provided, said head 20 carrying a cylindrical wheel 21 and being arranged on the bench 11 in such a manner that the axis 22 of the wheel 21 is displaced versus the axis 23 of the workpiece 16 by an angle corresponding to the cone angle of the conical seat 19 to be ground.

Figure 4:
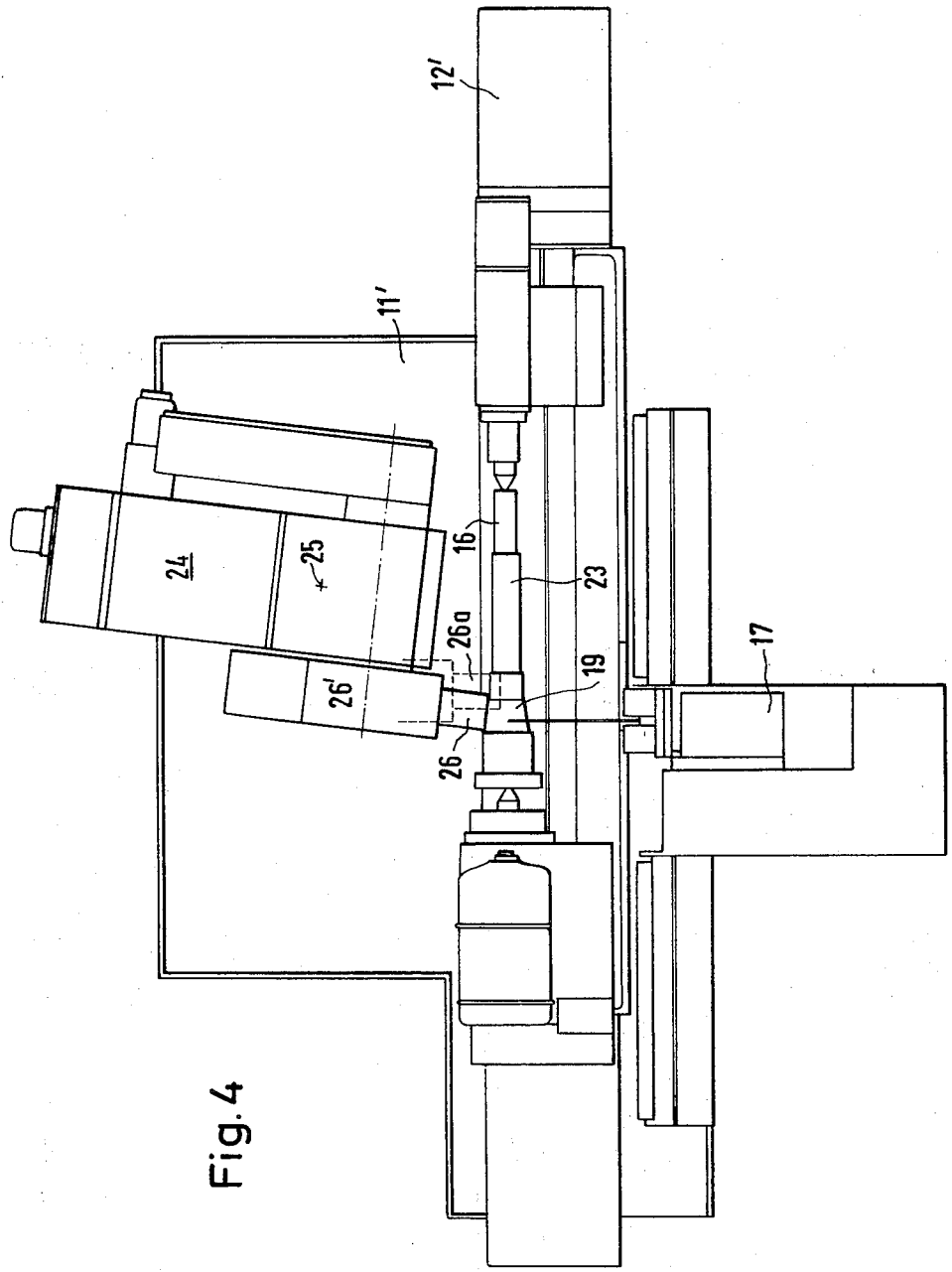
FIG. 4 shows a third embodiment of a grinding machine according to the present invention.

Analogously to the working method of the grinding wheel according to FIG. 1 or FIG. 2 the grinding machine 3 operates in such a manner that the cylindrical seats of the workpiece 16 are ground with the grinding wheel 15, and the conical seat with the wheel 21 of the angularly displaced grinding wheel head 20. FIG. 4 represents the third embodiment of the invention, i.e. a grinding machine with a bench 11', a workpiece support 12', into which is clamped a workpiece 16, into which a conical seat 19 is to be ground, a gage unit 17, and a grinding wheel head 24 which is swivable around an axis (e.g. 25) that is displaced from the axis 23 of the workpiece and that is perpendicular to the plane in which the axis 23 of the workpiece 16 lies for swivelling the non-dotted position of the wheel 26 into other positions, e.g. into the position 26a.

The grinding wheel head 24 of the grinding machine according to FIG. 4, comprising the feed mechanism 27 is mounted on a turntable 28 (see FIG. 5), mounted on a pin 29, pivotably mounted in a bearing 30 (only schematically shown) in the bench 11', and is supported in axial direction on a flat guide 31. The pin 29 supports a worm gear 32 adapted to be rotated by a worm 33, and said worm can be driven by hand or by motor, whereby in connection with a usual numerical control an electric stepping motor is provided.

Normally the weight of the grinding wheel 24 bears down fully on the guide 31. For swivelling the grinding wheel head 24 around an axis like 25 or an axis parallel thereto, the whole grinding wheel head is lifted hydrostatically off the guide 31; such hydrostatical lifting mechanisms are known and therefore not shown in the drawing.

Then the grinding wheel is swivelled by rotating the pin 29 by means of the worm 33 by hand or motor, and after achieving the required angle position the drive of the worm 33 is taken away or switched off resp., and the whole grinding wheel head is lowered again upon the flat guide 31

For grinding a workpiece 16 e.g. the grinding wheel head 24 is positioned in the manner outlined above first of all into the position 26a of grinding wheel 26, shown in dotted line, and then the cylindrical seats are ground. Then the grinding wheel head is swivelled into the solid line position of the grinding wheel 26 in the manner described, and then the conical seats are ground.

All grinding steps can be gage-controlled with the gage unit 17, also grinding the conical seat 19; it is only necessary to design the gage unit 17 movable in longitudinal direction so far that the travel of that portion of the periphery of the grinding wheel 26 adjacent to the workpiece 16 due to the swivelling movement of the wheel 26 around the axis 25 or an axis parallel thereto, can be coped with. Normally the gage unit 17 can be shifted for a certain distance in longitudinal direction of the workpiece; therefore, there are no particular measures required. However, it might be necessary to extend the longitudinal movement compared to the usual design. In case that conical seats 19 must be ground this cannot be done in the manner described in connection with FIG. 5, for grinding seats longer than the width of the grinding face is only possible when the grinding wheel is shifted, during the grinding process, parallel to the seat to be ground, i.e. the corresponding generatrix, regardless whether it is a cylindrical or conical seat, said operation being used for grinding cylindrical seats and known as long grinding. For long grinding of cylindrical workpieces the workpiece is shifted parallel to its axis, i.e. the workpiece support or workpiece slide 12 or 12' resp. is shifted in longitudinal direction; but when grinding conical seats the workpiece support 12 or 12' resp. cannot be shifted longitudinally, for the longitudinal movement must be carried out parallel to the generatrix to be ground, as was already mentioned.

Figure 5:
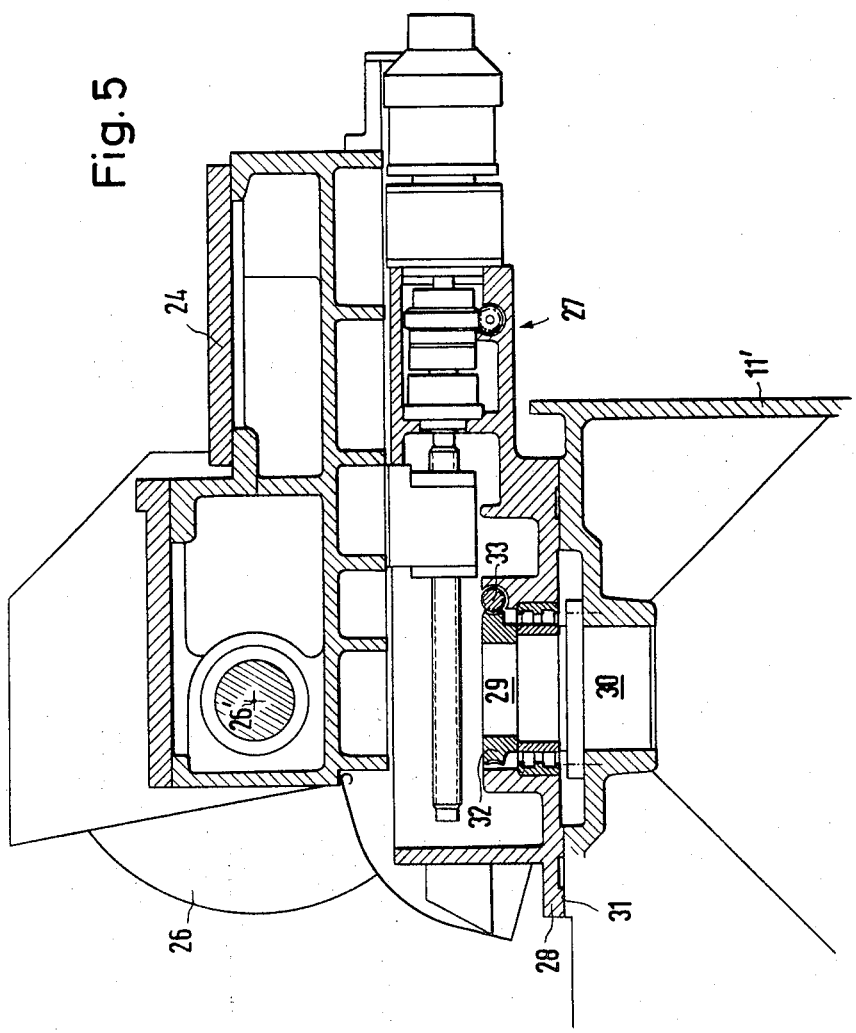
FIG. 5 shows a section of a swivable grinding-wheel head for a grinding machine according to FIGS. 3 or 4, resp.
Figure 6:
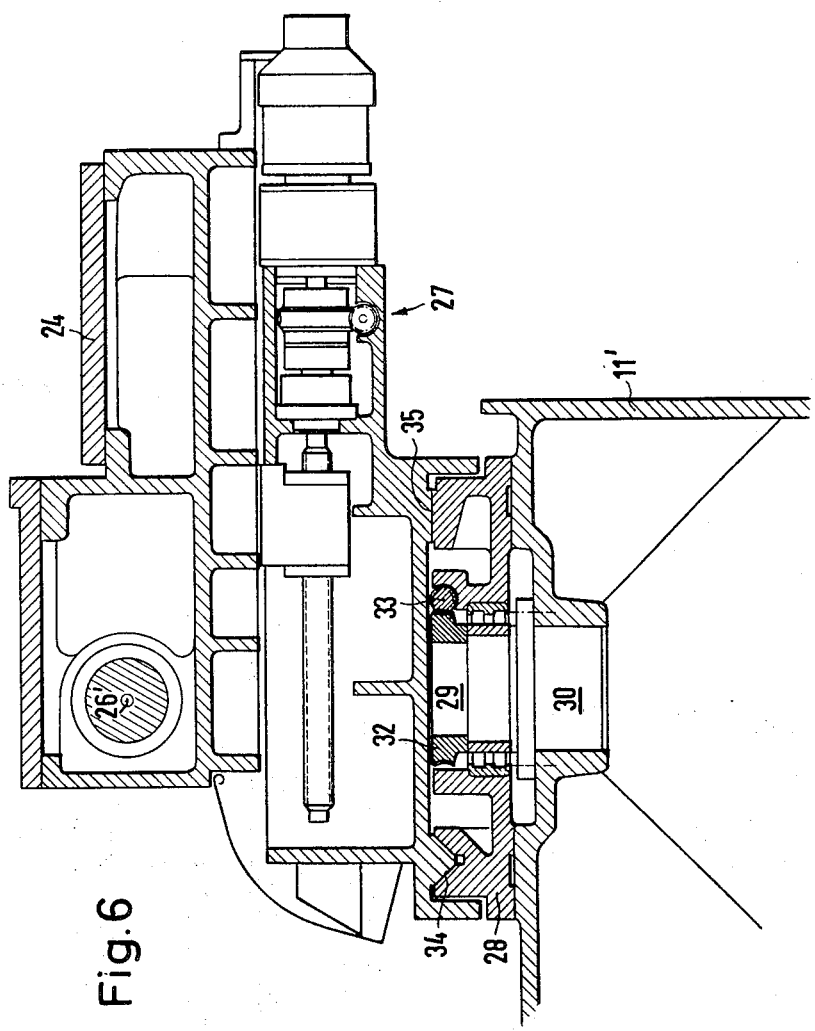
FIG. 6 shows a section corresponding to that shown by FIG. 5, of a grinding-wheel head having guiding means parallel to the spindle or wheel axis.

Therefore, it is possible to improve the structure according to FIG. 5 in a manner shown by FIG. 6, in so far that between the turntable 28 and the grinding wheel head 24 including the feed mechanism 27, there is provided a line guide, usually comprising a V-shaped guide 34, and a flat guide 35 extending perpendicular to the direction of movement of the feed mechanism 27. The drive acting in this direction is not shown in the drawing for clarity, for it can easily be incorporated by a worker skilled in the art. The line guide 32, 33, is parallel to the wheel axis 26' of the wheel 26 not shown in FIG. 6.

If the wheel head 24 is mounted according to FIG. 6 the grinding process takes basically place as described in connection with FIGS. 4 and 5; however, it might be possible to carry out a long grinding process with the embodiment of FIG. 6 by moving the wheel head 24 in the line guide 34, 35.

Thus the design according to FIG. 6 allows for the very first time to grind various arbitrary seats, but mainly also conical seats with the grinding wheels of any width.

Furthermore, it must be noted that also the wheel head 20 angularly displaced according to FIG. 3 may be designed according to FIGS. 5 or 6 in an adjustable manner or swivable so that an adjustment of a new angle position may be carried out while a workpiece 16 is clamped. The various possibilities herefore were discussed in detail already. However, the demanded requirements are not so high for an adjustable or swivable mechanism for a wheel head 20 of a machine according to FIG. 3 compared to a swivable mechanism of a machine according to FIG. 4, for usually it is possible with a machine like the one shown in FIG. 3 to carry out the adjustment or swivelling of the wheel head 20 when grinding-wheel head 13 is in operation. In view thereof for adjusting or swivelling the wheel head 20 there is available considerably more time, i.e. the total primary period of the grinding-wheel head 20 for at least one grinding process without having any effect on the total delays during the grinding process of one workpiece 16.

What I claim is:

1. Apparatus for grinding selectively in one setting cylindrical and conical seats into a workpiece, the apparatus comprising a bench upon which are mounted a workpiece support, and at least two grinding wheel heads, the improvement comprising that one of the grinding wheel heads is laid out for grinding cylindrical seats, and the other wheel head or wheel heads respectively for grinding conical seats, and that the workpiece support can be moved in direction of the workpiece axis so far that the workpiece position into which cylindrical or conical seats respectively are to be ground, can be placed in front of the grinding wheel of the grinding-wheel head concerned.

2. Apparatus according to claim 1,
   in which each grinding-wheel head for grinding conical seats carries a conical grinding wheel laid out according to the conical seats to be ground.

3. Apparatus according to claim 1,
   in which the spindle or wheel axis of a grinding-wheel head for grinding conical seats is disposed versus the axis of the workpiece, under an angle correspond-ing to the cone angle of the conical seat to be ground.

4. Apparatus according to claim 3, in which the grinding-wheel head which is angularly displaced versus the axis of the workpiece, is adjustable to at least two angle positions by swivelling around an axis which is perpendicular to the plane in which the workpiece axis lies.

5. Apparatus according to claim 4, in which the angle positions of the grinding-wheel head are limited by stops.

6. Apparatus according to claim 4, in which the angle positions of the grinding-wheel head may be selected at will.

* * * * *